United States Patent
Forman et al.

(10) Patent No.: US 7,814,078 B1
(45) Date of Patent: Oct. 12, 2010

(54) IDENTIFICATION OF FILES WITH SIMILAR CONTENT

(75) Inventors: George H. Forman, Port Orchard, WA (US); Stephane Chiocchetti, Antony (FR); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1195 days.

(21) Appl. No.: 11/156,955

(22) Filed: Jun. 20, 2005

(51) Int. Cl.
*G06F 17/00* (2006.01)
(52) U.S. Cl. ............... 707/698; 707/747; 707/749
(58) Field of Classification Search ............ None
See application file for complete search history.

(56) References Cited

U.S. PATENT DOCUMENTS

2005/0091234 A1* 4/2005 Hsu et al. ............ 707/100
2005/0216813 A1* 9/2005 Cutts et al. ............ 714/752
2006/0253476 A1* 11/2006 Roth et al. ............ 707/100

OTHER PUBLICATIONS

Quinlin at al., "Venti: A New Approach to Archival Storage", Jan. 2002, Proceedings of FAST 2002 Conference on File and Storage Technologies, pp. 1-14.*
Udi Manber, "Finding Similar Files in a Large File System", TR-93-33, Oct. 1993, Department of Computer Science, University of Arizona, pp. 1-10.*
Val Henson, Guidelines for Using Compare-by-hash, IBM, Inc., Red Hat, Inc. p. 1-14.

* cited by examiner

*Primary Examiner*—James Trujillo
*Assistant Examiner*—Michele C Choi

(57) ABSTRACT

A method, apparatus, and system identity files with similar content. One embodiment is a method that divides files into plural segments. The method computes a hash value and a size for each of the plural segments of the files. In order to identify which files have similar content, the method adds together segments common between files. File similarity information of files with similar content is output.

11 Claims, 3 Drawing Sheets

| | A | B | C | D | E | F | G | H | I |
|---|---|---|---|---|---|---|---|---|---|
| 1 | B. Clusters of Related Files: | | | | | 1627 clusters | 6661 files | 8.0 MB | |
| 2 | Cluster # | Total Size | # Files | Links | Type | % Similar | File Size | Filename | |
| 3003 | 1001 | 1366 | 2 | 1 | pair | 54 | 681 | ER/R555028125 | |
| 3004 | | | | | | 54 | 685 | ER/R555028007 | |
| 3005 | | | | | | | | | |
| 3006 | 1002 | 3976 | 2 | 1 | pair | 54 | 671 | KNO/B55400045 | |
| 3007 | | | | | contains | | 3305 | KNO/860613400 | |
| 3008 | | | | | | | | | |
| 3009 | 1003 | 1797 | 2 | 1 | pair | 53 | | | |
| 3010 | | | | | | 53 | 849 | KNO/F33300280 | |
| 3011 | | | | | | | | | |
| 3012 | 1004 | 1337 | 2 | 1 | pair | 52 | 948 | KNO/F33300287 | |
| 3015 | 1005 | 2381 | 2 | 1 | pair | 54 | | | |
| 3018 | 1373 | 93086 | 4 | 3 | achive | 63 | | | |

Fig. 5

IDENTIFICATION OF FILES WITH SIMILAR CONTENT

BACKGROUND

Some databases store an enormous number of documents. These documents can be stored in a single warehouse or distributed throughout many different repositories. As part of content management, these documents are periodically merged and groomed. In some instances, documents from two different repositories are merged into a larger repository. For example, multiple collections of documents are coalesced to reduce maintenance overhead.

One challenge in content management is to identify documents that are duplicative of each other. Duplications emerge when documents or portions of documents are copied and stored again. In other situations, newer or updated versions of documents are stored, but the antiquated versions are not deleted from storage.

For many reasons, the proliferation of duplicative documents is undesirable. Redundant copies require extra storage space. Further, duplicative documents burden resources, especially during document searches. If a document is irrelevant or outdate, then it can pollute a list of search results. Reducing the number of duplicates and overlapping documents (or documents containing portions of other documents) can reduce the number of documents shown and, thus, enhance productivity.

Situations also exist when information in documents reaches an end of its retention period. Regulatory compliance, for example, can dictate that certain information must be expunged from a repository. If the content of a document has been copied into other documents, these documents need to be identified for pruning at the time the original document is deleted.

BRIEF DESCRIPTION OF THE DRAWINGS

FIG. 5 illustrates an exemplary output for similarity between files in accordance with an embodiment of the present invention.

DETAILED DESCRIPTION

Figure 1:
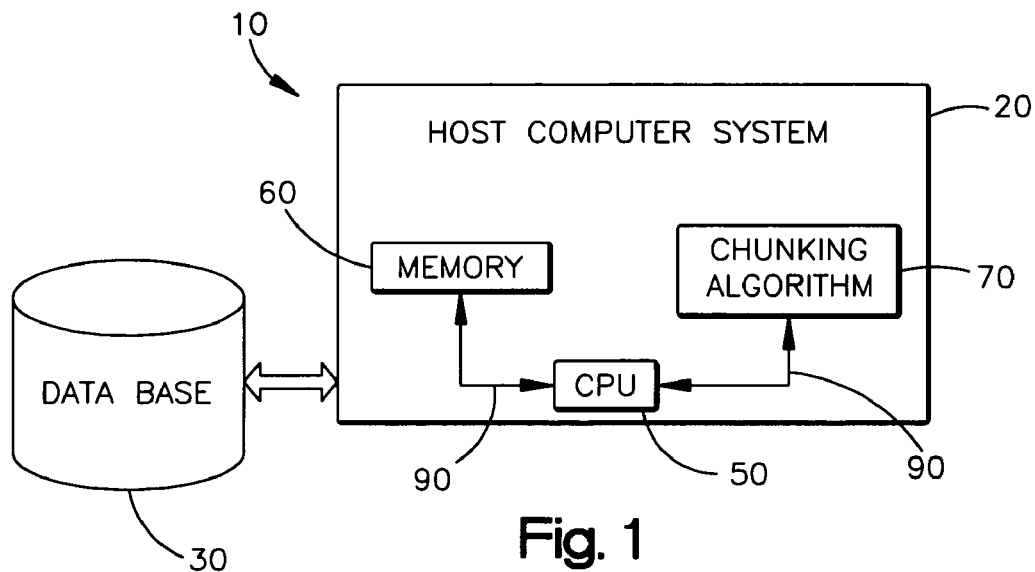
FIG. 1 illustrates an exemplary system in accordance with an embodiment of the present invention.

Exemplary embodiments in accordance with the present invention are directed to systems, methods, and apparatus for identifying files with similar content. These embodiments are utilized with various systems and apparatus. FIG. 1 illustrates an exemplary embodiment as a system 10 for identifying files or documents with similar content.

The system 10 includes a host computer system 20 and a repository, warehouse, or database 30. The host computer system 20 comprises a processing unit 50 (such as one or more processors of central processing units, CPUs) for controlling the overall operation of memory 60 (such as random access memory (RAM) for temporary data storage and read only memory (ROM) for permanent data storage) and a chunking algorithm or file similarity algorithm 70. The memory 60, for example, stores data, control programs, and other data associate with the host computer system 20. In some embodiments, the memory 60 stores the file similarity algorithm 70. The processing unit 50 communicates with memory 60, data base 30, file similarity algorithm 70, and many other components via buses 90.

Embodiments in accordance with the present invention are not limited to any particular type or number of data bases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Figure 2:
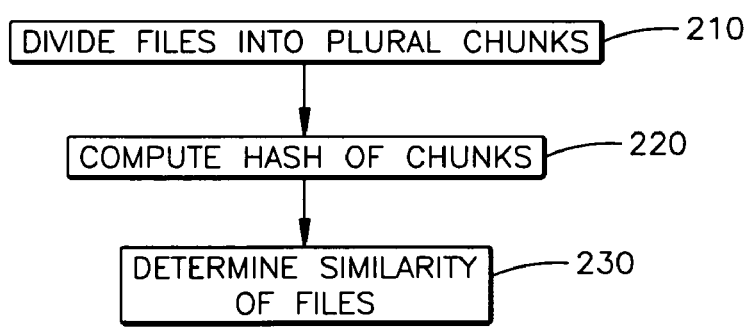
FIG. 2 illustrates an exemplary flow diagram in accordance with an embodiment of the present invention.
Figure 3:
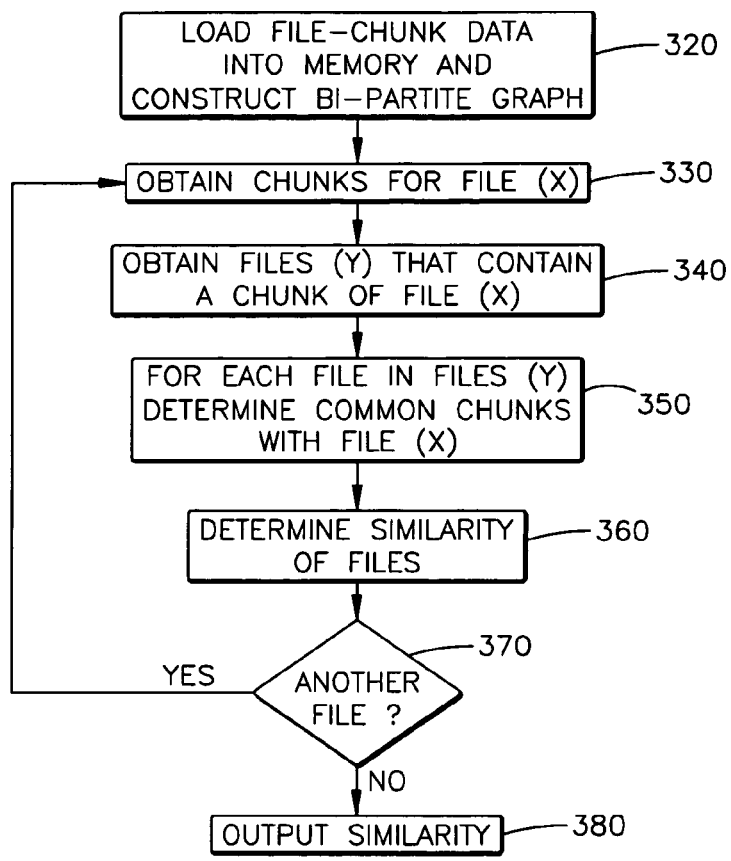
FIG. 3 illustrates an exemplary flow diagram in accordance with an embodiment of the present invention.

Reference is now made to FIGS. 2-4 wherein exemplary embodiments in accordance with the present invention are discussed in more detail. In order to facilitate a more detailed discussion of exemplary embodiments, certain terms and nomenclature are explained.

As used herein, the term "chunking" means automatically dividing or separating, with a computing device, a file into plural smaller units, segments, or chunks.

As used herein, the term "file" has broad application and includes documents (example, files produced or edited from a software application), collection of related data, and/or sequence of related information (such as a sequence of electronic bits) stored in a computer. In one exemplary embodiment, files are created with software applications and include a particular file format (i.e., way information is encoded for storage) and a file name. Embodiments in accordance with the present invention include numerous different types of files such as, but not limited to, text files (a file that holds text or graphics, such as ASCII files: American Standard Code for Information Interchange; HTML files: Hyper Text Markup Language; PDF files: Portable Document Format; and Postscript files), program files, and/or directory files.

As used herein, a "graph" is a set of objects, vertices, or nodes that are connected or linked with edges or arcs. A "vertex" (plural, "vertices") is an item, object, or node in a graph. An "edge" is a connection between two vertices of a graph. Further, as used herein, a graph can be decomposed wherein the vertex set is partitioned into paired disjoint independent subsets called "partite sets." For example, a graph can be decomposed into two partite sets but not fewer ("bipartite"), three partite sets but not fewer ("tripartite"), or k partite sets but not fewer (k-partite). Thus, a "multipartite" graph is decomposed into multiple numbers of partite sets.

FIG. 2 illustrates an exemplary flow diagram for computing or identifying files with similar content. In one exemplary embodiment, the flow diagram is used in content or file management to identify files that are duplicates of each other or that contain duplicative information.

According to block 210, each file is divided or separated into plural portions, units, segments, or chunks. The files, for example, are retrieved or provided from one or more storage locations, such as data base 30 in FIG. 1 or various geographically distributed databases. Various methods can be used to divide a file into chunks. For example, content-based chunking is one exemplary method of breaking a file into a sequence of chunks or segments. Local content of the file determines the boundaries (or breakpoints) for the plural chunks in a file. Chunks or segments of a file have different or non-fixed sizes.

As another example, chunks can have fixed sizes. For example, the distance from the beginning of a file determines the chunk boundaries.

In one exemplary embodiment, chunking is based on the content of the file and produces chunks with different sizes. An exemplary algorithm functions as follows: Assume a pair of pre-determined integers D and r, wherein r<D. A fixed width sliding window of width W is moved across the file. At every position k in the file, a fingerprint $F_k$, of the contents of this window is computed. The fingerprint, for example, is computed using a fingerprint algorithm (such as Rabin's fingerprint algorithm). Accordingly, the position k is a chunk boundary if $F_k \bmod D = r$; otherwise, the position k is not a chunk boundary.

In content-based chunking, if additional data is inserted into a file or data is removed from the file, then breakpoints or boundaries are less likely to change than with fixed size blocks. In other words, chunk boundaries in locations outside of the modification mostly remain in the same position relative to each other. As such, the boundaries of content-based chunking are more stable during local modification to the content of the file.

According to block 220, a hash for each chunk is computed. A hash value, for example, is a number generated from a string of text or data. The hash is generally smaller than the text itself and is generated by a formula. A hash function H, for example, is a transformation that takes an input "m" and returns a fixed-size string, called a hash value "h" (such that h=H(m)). The hash value concisely represents the chunk (i.e., the longer portion of the file or segment from which the hash was computed). This value is also called the message digest.

The hash value is shorter than the typical size of the chunk and fixed in length or size. As such, hashes are computationally quicker to compare than chunks. Further, hashes provide efficient data structures for lookup and comparison (example, reverse indices and lookup tables). In one exemplary embodiment, for a given pair of chunks, they are either a perfect match (i.e., having the same hash code) or their hash codes differ. For example, a single character in the chunks could be different and, thus, produce a different hash code. As another example, in a sequence of consecutive chunks in the middle of file A (example, ten chunks in file A), file A can have varying degrees of similarity to another file B. For instance, the first three chunks in file A can be the same as file B. Then file B has one non-matching chunk with file A, and the next seven chunks of file B match the remainder of the ten chunks from file A.

One exemplary embodiment computes a cryptographic hash for each chunk. In a cryptographic hash, the hash value is computationally simple to calculate for an input, but it is difficult to find two inputs that have the same value or to find an input that has a particular hash value. Preferably, the hash function is collision-resistant. The bit-length of the hash code is sufficiently long to avoid having many accidental hash collisions among truly different chunks.

A variety of hash functions (now known or developed in the future) can be utilized with embodiments in accordance with the present invention. Examples of such hash functions include, but are not limited to, MD5, SHA-1 (Secure Hash Algorithm), digital signatures, and other known or hereafter developed hashing algorithms.

According to block 230, a determination is made whether the files are similar. In one exemplary embodiment, the hash codes of chunks are compared to determine similarities and/or differences between two or more files. Two different files, for example, can be similar even though the two files are not identical. As used herein, the term "similar" or "similarity" means having characteristics in common and/or closely resembling each other. Thus, two files are similar if they are identical or if they have characteristics or substance in common.

By way of example, after an article is saved in a database, an updated or revised version can be produced. This revised version of the article can remove material included in the earlier version or add new material not included in the first versions. The addition of new material or subtraction of material can be minor and include, for example, correction of spelling or grammatical errors, updates to cited references, and other edits to text. Although the first and revised versions of the article are not identical, the two versions are similar.

One exemplary embodiment includes databases distributed in different locations. The flow diagram of FIG. 2 is applicable to this distributed system. For example, for each database or for each storage location, the files are divided into plural chunks and the hashes of chunks are computed, according to blocks 210 and 220. Then, according to block 230, the similarity of files is determined at a central or common location.

FIGS. 3-4 illustrate exemplary diagrams for determining similarity of chunk hashes in accordance with an embodiment of the present invention.

According to block 320, file-chunk data is loaded into memory, and a graph is constructed of the file-chunk data. In one exemplary embodiment, the file-chunk data includes three components for each file: (1) the hash code or value of each chunk in the file, (2) the length or size of each chunk, and (3) a file name or directory path that points to the file. For example, for each file in a repository, divide the contents of the file into chunks; and for each chunk, record or store its byte length and its hash value. The size of this metadata amounts to a small percentage of the size of the original file content and depends on the hash length and average chunk size parameters.

Different file names that refer to the same file contents can cause superfluous output. Thus, in one exemplary embodiment, while loading the file-chunk data, a hash is generated over all chunk hashes. This generated hash yields a single hash to identify the files by their content. In this manner, multiple filenames referring to identical content are removed or listed out separately. The remaining computations in the file similarity algorithm, thus, utilize a single copy of each unique file.

The graph (such as a bipartite graph) is constructed of the file-chunk data. The graph is incrementally constructed, for example, when the file-chunk metadata file is read. The graph has an edge between a vertex of a file and a vertex of a chunk if the chunk occurs in the file. In one exemplary embodiment, the file nodes are annotated with their file size (example, in bytes); the chunk nodes are annotated with their chunk size (example, in bytes), and the edges are annotated with how many times they reoccur for that file (usually just once).

Figure 4A:
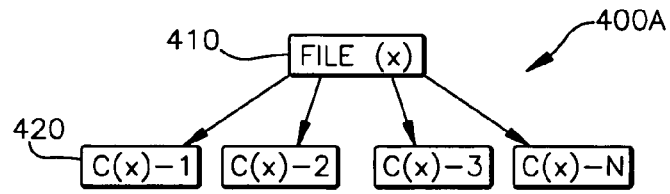
FIG. 4A illustrates an exemplary diagram for determining similarity of chunk hashes in accordance with an embodiment of the present invention.

An exemplary diagram or graph 400A is shown in FIG. 4A, wherein "X" denotes a particular file. Each file has plural chunks. Here, file(X), shown as 410, has plural chunks 420, noted as chunk (X)-1, chunk(X)-2, chunk(X)-3, ... to chunk (X)-N, wherein "N" is an integer that denotes the total number of chunks for file(X). The arrows extending from the file to the chunk graphically represent edges. An edge exists if a chunk refers to a file.

According to block 330, the chunks for a file are obtained (shown as file(X)). Next, according to block 340, obtain all files(Y) that contain a chunk of file(X). Then, according to block 350, for each file in files(Y), determine common chunks with file(X).

Figure 4B:
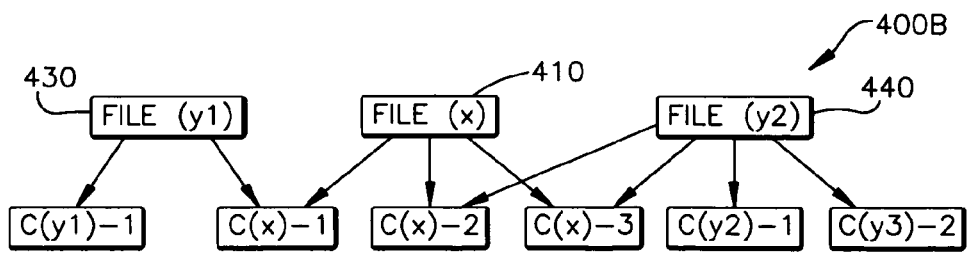
FIG. 4B illustrates an exemplary diagram for determining similarity of chunk hashes in accordance with an embodiment of the present invention.

FIG. 4B provides an exemplary diagram or graph 400B illustrating blocks 330-350. This figure is provided for illustration and includes specific data (such as a certain number of files, chunks, edge connectivity, etc.) that is not provided to limit embodiments in accordance with the present invention.

In FIG. 4B, file(X) has three chunks, labeled C(X)-1, C(X)-2, and C(X)-3. For each of the three files, a separate edge extends from the file to each respective chunk. File(Y1), shown as 430, and file(X) each have an edge directed to the same chunk, namely C(X)-1. Thus, file(Y1) and file(X) have one common chunk. File(Y2), shown as 440, and file(X) each have an edge directed to two different chunks, namely C(X)-2 and C(X)-3. Thus, file(Y2) and file(X) have two common chunks.

According to block 360, a determination is made on the similarity between common chunks identified in block 350 in order to determine similarity between files. In one exemplary embodiment, the sizes of common chunks are added together to generate a common chunking number. This computation is possible since (as noted in block 350 of FIG. 3) the saved file-chunk data includes both (1) the hash code or value of each chunk, and (2) the length or size of each chunk. In some exemplary embodiments, a chunk is added multiple times if it appears in common chunks multiple times. Thus, if a chunk appears N times (N being an integer>0), then the chunk is added N times.

Computations are performed on the common chunking number to determine a similarity between common chunks in different files. In one exemplary embodiment, the common chunking number is converted to a similarity score. For example, the chunking number is converted to a lower bound on the similarity percentage between the two files by dividing by the length of the shorter file. This computation or similarity score determines how much similarity exists between the two files.

Various determinations can be utilized to determine when two files are similar. In one exemplary embodiment, if the similarity score exceeds a pre-defined threshold, then the files are similar; otherwise, the files are dissimilar. For example, include two files A and B in a file-file similarity graph if the similarity score is at or above a threshold value or number. In one exemplary embodiment, the two files (example A and B) in the graph are annotated on the edge about how they are similar (example, annotated with the similarity score).

The following discussion provides another exemplary illustration for computing similarity between two different files. In one exemplary embodiment, a separate file-file similarity graph is constructed as follows: For each file A, determine the chunks AC that occur in the file A. For each chunk in AC, obtain all the files in which the particular chunk appears. Accumulate the set of other files BS that share any chunks with file A. As an optimization due to symmetry, files are excluded that have been previously considered as a file A. For each file B in the set BS, determine the chunks in common with file A. Add A-B to the file-file similarity graph if the total chunk bytes in common exceeds a threshold (example, a percentage of file length).

According to block 370, an inquiry is made: Does another file? If the answer is "yes," then the flow diagram loops back to block 330. Here, the blocks are repeated for the new or next file. If the answer is "no," then the flow diagram proceeds to output the similarity at block 380.

The file similarity information can be output in a variety of embodiments in accordance with the invention. In one embodiment, for example, the file similarity information is saved, printed, displayed to a user, and/or utilized in additional computations. By way of example, a union-find algorithm is used to calculate clusters of interconnected files. The clusters are sorted (example, according to size). For each cluster, various computations are performed and output. Such computations include, but are not limited to, a list of file-file similarities, a total number of files involved, an average similarity of links, etc.

FIG. 5 illustrates an exemplary output 500 for similarity between files in accordance with embodiments of the present invention. The figure illustrates an exemplary screen shot. The specific format of the figure and specific data (such as cluster numbers, sizes, values, letters, etc.) are provided merely to illustrate a graphical output for an exemplary embodiment of the present invention.

FIG. 5 shows the total number of files analyzed 510 (shown as number 6661) with the number of clusters 520 (shown as number 1627). The screen shot visually provides an illustration of file similarity. For example, cluster number 530 (shown as 1002) shows similarity between two different files 540A, 540B (shown as KNO/B55400045 and KNO/860613400). In some embodiments, shading is used to visually identify or highlight criteria, such as similarity between files.

Embodiments in accordance with the present invention include partitioning the files and/or associated data (example, when the enormity of the files exceeds available memory). A partitioning algorithm is used to divide the files into data sets that are small enough to fit in physical memory.

The following discussion provides examples for partitioning a large data set of files. In one embodiment, for example, the file-chunk data is partitioned into independent data collections that fit within available space in memory.

As another example, have the file-chunk metadata stored in a file format that contains the chunk hash code and the filename on each line. Here, the filename and its directory path are referred to by a short index number into a table of filenames stored in a database. In the following example, the first column represents the size of the chunk hash code; the second column represents the hash code for the chunk; and the third column represents the filename:

| 298 | 9E123814C58254D237F9E19B5D9C4E5A | file832 |
| 184 | 33F3C217EBDFC714C8996D2559484D6F | file832 |
| 142 | DD275200C54CBF7262809BD4D134F215 | file832 |
| 103 | 804C3E31FB559E2A8289A9015624C392 | file832 |
| 152 | B0E77C988953A1E0DDA5D2FBF262D07B | file832 |

As another example, a disk-based sort computation is performed on the file-chunk data. At the end of this computation, all the files that refer to a given chunk are in adjacent lines in the file. As an alternative to this example, a disk-based recursive hash-bucket sort is performed. This computation yields the same desired post-condition property, but without having a global order defined.

As yet another example, a union-find algorithm is performed on a graph where each file is represented by a vertex. For each chunk encountered in the sorted input file, all the different files it refers to are unioned into the same connected component. At the end of this process, the connected components are identified by the union-find data structure. Each of these represents a subset of files that are separately processed.

In one exemplary embodiment, a percentage of the connected components contain only a single file. These files are discarded as not being similar to any other files. The discarded files, thus, require no further processing.

In one exemplary embodiment, a bin-packing algorithm is used to gather together multiple connected-components that can fit in memory all at once. If there are many small connected-components, then this process reduces the number of separate files generated in subsequent steps and reduces the overall number of times the file similarity algorithm is run.

In one exemplary embodiment, the file-chunk association data (either the sorted file or the original unsorted version) is re-read and an output is generated of the lines into different files according to the different bins determined by the partitioning algorithm. Each of these files serves as an independent input to the remainder of the file similarity algorithm.

In one exemplary embodiment, the computation of the chunks of the source files is performed in a parallel or distributed fashion. Furthermore, separate repositories that do not share storage or administrative domains can still collaborate in duplicative detection if the same file similarity algorithm is applied to each repository. In one exemplary embodiment, only the file-chunk metadata is shared, especially if the repositories are geographically distributed or belong to different entities that pool technical support knowledge.

In some exemplary embodiments, the output includes clusters of files that are similar because the files contain common templates or common boilerplate text (such as common text regarding licensing or copyright terms). For example, a set of graphs made by a gnuplot program all contain the same long pre-amble, and so all gnuplot files are found to contain a large amount of duplication. As another example, common templates occur in technical support document databases because the support documents are based on lengthy templates.

In order to disband such clusters, the clusters are noted as being similar due to template similarity. The file similarity algorithm then records that the chunks in common represent a template. These chunks are ignored on future runs of the algorithm to reduce the file sizes to their non-template payload. By way of example, suppose an analyst discovers a cluster of documents having similar templates. The file similarity algorithm determines which chunks are the most frequent or common in the cluster and eliminates these chunks. For example, in a cluster of 185 documents, if 17 chunks are shared by all of the documents, then these 17 chunks are eliminated from consideration. Such chunks are eliminated from consideration by removing them from the file-chunk graph and downwardly adjusting the size of the affected files. These acting effectively remove content of the templates from the files. A determination of file similarity is then performed on the remaining content (without re-chunking). In some exemplary embodiments, this process is repeated or iterated one or more times.

In one exemplary embodiment, the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   dividing each of a plurality of files into segments based on their data content, wherein the segments are unequal in length;
   computing a hash value of each segment's data content and recording the hash value with a length of the corresponding segment;
   comparing hash values from the segments of different files in the plurality of files to determine which pairs of files have common segment; and
   for any pair of files having common hash values:
      computing a common total length by subtotaling the length of each segment recorded with each common hash value;
      converting the common total length to a similarity score by dividing the common total length by a length of a shorter file of the pair of files; and
      outputting file similarity information of the pair of files having common hash values.

2. The method of claim 1, further comprising constructing a bipartite graph of the plurality of files and the segments, wherein the bipartite graph has an edge between a vertex of any one of the plurality of files and a vertex of any one of the segments when the segment occurs in the any one of the plurality of files.

3. The method of claim 1, further comprising:
   determining a set of files from any of the plurality of files that have a common segment with a first file;
   determining a number of common segments between the first file and each file in the set of files; and
   generating a file similarity score between the first file and each file in the set of files.

4. The method of claim 1, further comprising constructing a graph having file nodes, wherein each file node is annotated with a length of the corresponding file and segment nodes, where each segment node is annotated with a length of the corresponding segment, wherein edges of the graph extend from the file nodes to the segment nodes and indicate common segments between two files.

5. A method executed by a computer, comprising:
dividing each of a plurality of files into chunks based on their data content, wherein the chunks are unequal in length;
for each of the plurality of files, computing a hash value for each chunk's data content in the corresponding file and recording each hash value with a length of the corresponding chunk;
comparing the hash values from the chunks of different files in the plurality of files to determine which pairs of files have common chunks; and
for any pair of files having common hash values:
computing a common total length by subtotaling the length of each chunk recorded with each common hash value;
converting the common total length to a similarity score by dividing the common total length by a length of a shorter file of the pair of files; and
outputting file similarity information of the pair of files having common hash values.

6. The method of claim 5, further comprising generating a graph having file nodes annotated with file lengths in bytes and chunk nodes annotated with chunk lengths in bytes.

7. The method of claim 5, further comprising storing for each of the plurality of files (1) the hash value of each chunk's data content, (2) the length of each of the chunks, and (3) a directory path that points to each of the plurality of files.

8. The method of claim 5, further comprising computing a hash value for each of the plurality of files and comparing the hash values to determine if duplicative files exist.

9. The method of claim 5, further comprising comparing the similarity score to a threshold value to determine whether the pair of files are similar.

10. The method of claim 5, further comprising partitioning each of the plurality of files into plural data collections when a collective size of the plurality of files exceeds available memory.

11. A computer system, comprising:
a memory storing programming code; and
a processor that executes the programming code stored in the memory to perform operations of:
dividing each of a plurality of files into segments based on their data content, wherein the segments are unequal in length;
generating a graph with edges extending from nodes of the plurality of files to vertices of the segments;
annotating the nodes with file length information in bytes of each of the plurality of files and annotating the vertices with segment length information in bytes of the segments;
identifying files with similar content by determining which of the plurality of files have edges that point to a same segment;
computing a hash value of each segment's data content and recording the hash value with a length of the corresponding segment;
comparing hash values from the segments of different files in the plurality of files to determine which pairs of files have common segments; and
for any pair of files having common hash values:
computing a common total length by subtotaling the length of each segment recorded with each common hash value;
converting the common total length to a similarity score by dividing the common total length by a length of a shorter file of the pair of files; and
outputting file similarity information of the pair of files having common hash values.

* * * * *

UNITED STATES PATENT AND TRADEMARK OFFICE
CERTIFICATE OF CORRECTION

PATENT NO.         : 7,814,078 B1                           Page 1 of 1
APPLICATION NO.    : 11/156955
DATED              : October 12, 2010
INVENTOR(S)        : George H. Forman et al.

It is certified that error appears in the above-identified patent and that said Letters Patent is hereby corrected as shown below:

In column 5, line 59, delete "file?" and insert -- file exist? --, therefor.

In column 8, line 45, in Claim 1, delete "segment;" and insert -- segments; --, therefor.

In column 9, line 2, in Claim 4, delete "wherein" and insert -- where --, therefor.

Signed and Sealed this
Ninth Day of August, 2011

David J. Kappos
*Director of the United States Patent and Trademark Office*